May 2, 1950 A. C. BURKE 2,506,342
PLACENTA FILTER
Filed Aug. 9, 1947 2 Sheets-Sheet 1

Inventor
Arnold C. Burke
by Douglas S. Johnson
Agent

May 2, 1950     A. C. BURKE     2,506,342

PLACENTA FILTER

Filed Aug. 9, 1947     2 Sheets-Sheet 2

Inventor
Arnold C. Burke
by Douglas S. Johnson
Agent

Patented May 2, 1950

2,506,342

UNITED STATES PATENT OFFICE 2,506,342

PLACENTA FILTER

Arnold C. Burke, Toronto, Ontario, Canada

Application August 9, 1947, Serial No. 767,721

8 Claims. (Cl. 250—65)

This invention relates to filters for use in radiography, and more particularly to a filter particularly adapted for use in obtaining X-ray plates of an area of the human body, and the principal object of the invention is to provide a filter for use with an X-ray source by means of which a single negative or plate of substantially equal or even density depicting the bone structure, organs and body tissue of the area X-rayed can be obtained whereby the single negative will give an accurate and related picture of uniform clarity of the whole area to greatly facilitate observations and will save valuable time and material and eliminate possible error in correlating the several X-rays required to investigate the same area without the use of my filter.

A further and important object is to provide an X-ray filter particularly adapted for obtaining a single negative of substantially equal density covering the human placenta and presenting the bone structure, organs and body tissue of the fetus and enveloping placenta with equal clarity.

A further object is to provide an X-ray filter which can be readily mounted on an X-ray machine and which can, without removal therefrom, be very quickly reversed to enable even density X-ray pictures to be obtained from opposite sides of the object or patient being X-rayed.

A still further object is to provide a filter which will be inexpensive to manufacture and which will be extremely simple to use.

The principal feature of the invention consists in providing a novel form of interceptor or filter element adapted to be reversibly mounted between an X-ray source and the object or body to be X-rayed, said filter being of non-uniform thickness, the thickness being varied inversely to the variations in the density of the object placed to subtend the filter and X-ray source whereby the rays penetrating the thickest portion of the filter are directed towards the least dense portion of the object under examination, and the rays penetrating the thinnest portion of the filter are directed towards the most dense or opaque portion of the object.

A further and important feature consists in forming the filter element of tapered, superimposed segments mounted on a rotatable ring member, the filter having an opening therethrough to leave the rays directed towards the most dense portion of the body under investigation unimpeded and the superimposed segments being arranged in overlapping arrangement to present an increasing barrier to the passage of X-rays directed towards the increasingly less dense portions of the object.

A still further and important feature consists in pivotally mounting the filter element in such a manner that it can be quickly reversed to interchange the position of the tapered segments without changing the distance of the centre line of the filter from the X-ray source whereby a second exposure can be taken from the opposite side of the object or patient undergoing examination.

A still further feature consists in mounting the filter element in a base or mount adapted to be readily secured to an X-ray machine and diaphragming the rays passing through the filter by means of a cone secured to said base.

Referring to the accompanying drawings.

Figure 1:
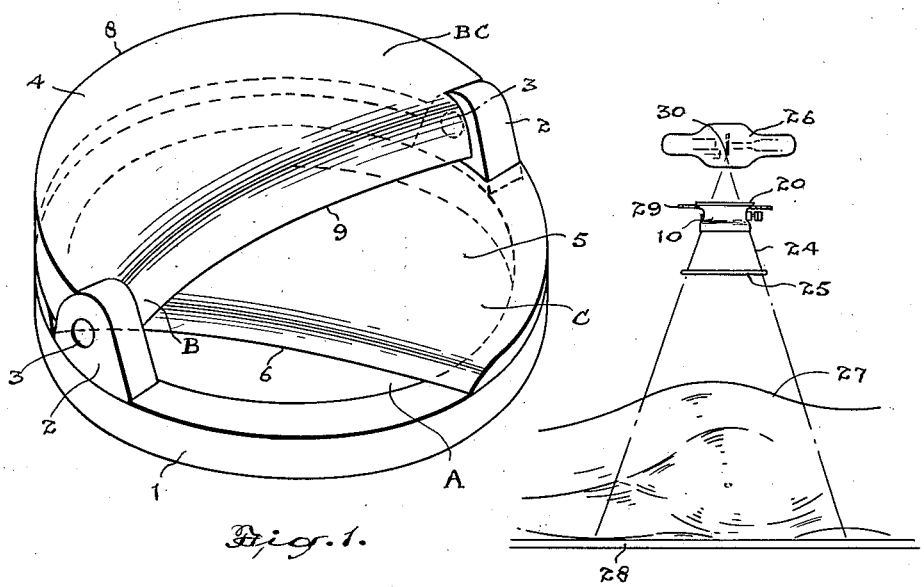
Figure 1 is a perspective view of a filter element embodying my invention and adapted for use in X-raying the human placenta and illustrating the use of the overlapping tapered segments.
Figure 3:
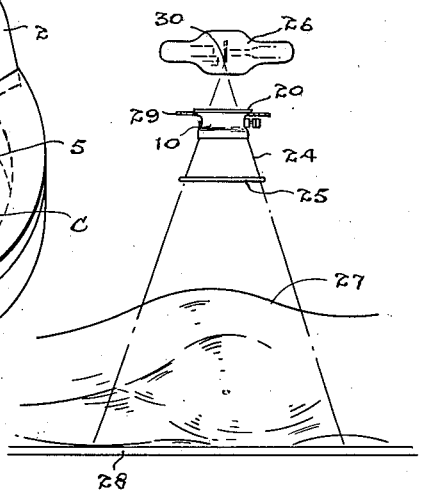
Figure 3 is an elevational view illustrating the application of my filter unit in obtaining an X-ray of the human placenta and showing the relation of the filter relative the X-ray source and the patient.

In the past in making a comprehensive X-ray study of a given area of the body or of an object, it has been necessary to make a series of exposures of different lengths to show the organs or less dense portions, as well as the denser areas or bone structures. The negatives obtained with the different exposures must then be co-related and interpreted, resulting in a considerable expenditure of time and material and leading to errors and inaccuracies.

The present invention has been devised to overcome the above difficulty by providing a filter arrangement whereby a single negative of substantially even density showing the dense media and less dense tissues or areas with equal clarity can be obtained.

With reference to the accompanying drawings, my filter element illustrated, which has been designed for particular use in obtaining X-ray plates of the human placenta, consists of a mounting ring 1 to which is secured upwardly extending pivot lugs 2 arranged in diametrically opposing relation and provided with aligned orifices 3 the axes of which are arranged to correspond to the centre line of the completed filter element.

Mounted on the ring 1, in overlapping relation, are a pair of filter plates or segments 4 and 5, which are preferably formed of aluminum. The relatively thin under plate 4 is crescent shaped and covers a major area of the ring and is tapered gradually, being thinnest at its concave edge 6 and thickest adjacent the central portion of its convex edge 7.

The upper filter plate 5 is considerably thicker than the lower plate 4 and is also of crescent shape, tapering in thickness from the central portion of its convex edge 8 to its concaved edge 9 with a relatively abrupt change in thickness adjacent the edge 9.

The plates or segments 4 and 5 are secured to the ring 1 on the same side as the pivot lugs 2 with the axes of the orifices 3 are stated, coinciding with the horizontal centre line of the filter plates to enable the filter to be maintained at the proper focal length when reversed, as will hereinafter be described.

Figure 7:
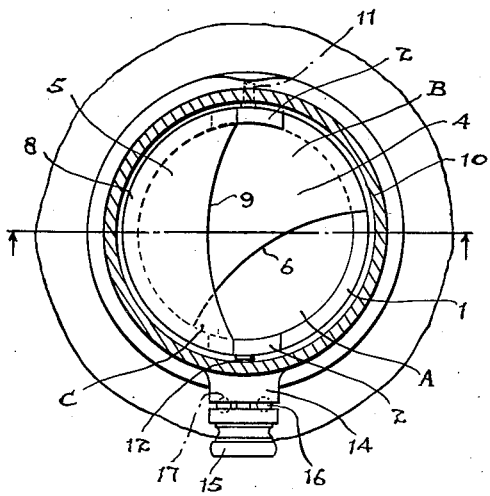
Figure 7 is a plan view of the filter unit with the filter element in position corresponding to Figure 5.
Figure 8:
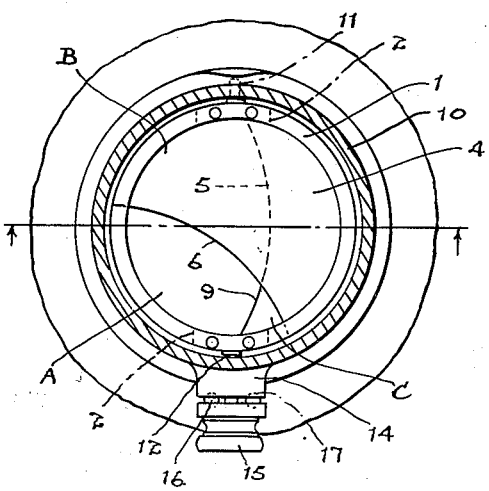
Figure 8 is a plan view similar to Figure 7, but with the filter element reversed.

In the arrangement illustrated, particularly in Figures 1, 7 and 8, it will be seen that the filter element comprises an open area A through the ring 1, a sector B of the ring area covered by the filter segment 4 alone, a sector C covered by the filter segment 5 alone, and a sector or area BC covered by both the filter segments 4 and 5.

The ring 1 with the filter plates secured thereto, is rotatably supported within a cylindrical cast aluminum casing or mount 10 by means of pivot pins 11 and 12 which are journalled in the wall of the casting in diametrically opposing relation and extend into the orifices 3 of the pivot lugs 2, being held from rotation therein by suitable locking pins 13.

On the outward end of the pivot pin 12, which extends through a bearing boss 14 formed in the casting wall, is secured an indexing knob 15 by means of which the ring 1 can be rotated and the knob may be suitably marked or indexed to indicate the position of the filter element.

To positively locate the filter element correctly with the axis of the ring 1 in alignment with the axis of the casting or mount 10 some form of indexing means is preferably provided. This means as shown in Figures 7 and 8 comprises a pair of spring actuated balls 16 mounted in recesses in the face of the knob 15 and adapted to enter shallow recesses 17 in the face of the casting boss 14 when the filter element is in axial alignment with the casting.

While the balls will normally hold the filter element in correct position, an excessive turning moment will readily move them out of the recesses 17 to permit the filter to be rotated.

Figure 2:
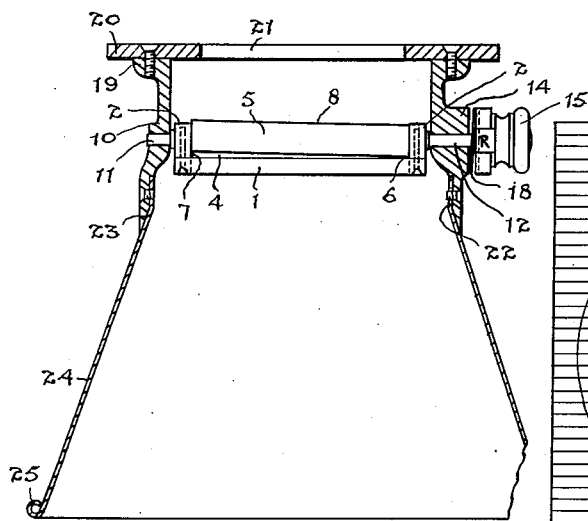
Figure 2 is a vertical mid-sectional view of the complete filter unit, incorporating my novel form of filter element.

In Figure 2 a spring bronze indexing disc 18 is used as an indexing means in place of the ball arrangement of Figures 7 and 8.

Figure 5:
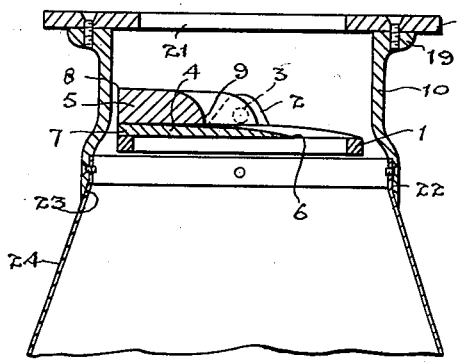
Figure 5 is a mid-vertical, sectional view of the filter unit taken at right angles to Figure 2.
Figure 6:
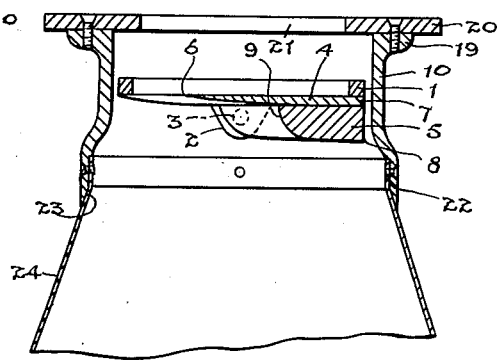
Figure 6 is a view similar to Figure 5, but showing the filter element reversed.

As shown in Figures 2, 5 and 6, the casting or mount 10 is formed with an upper, outwardly extending annular shoulder 19 to which is secured a suitable mounting slide plate 20 formed with a central circular opening 21.

The lower end 22 of the casting is enlarged and is provided with a bevelled inner edge 23, and secured to the end 22 and abutting the bevelled edge 23 thereof is a spun copper frusto-conical diaphragming extension 24 formed with a beaded or rolled reinforcing lower edge 25.

In using my filter the whole filter unit, including the casting 10 carrying the radiographic cone 24 and with the mounting ring 1 in place, is mounted between an X-ray source 26 and the patient 27 placed on a table 28 located beneath the X-ray source. The mounting of the casting or filter mount 10 is accomplished by inserting the slide plate 20 into a suitable guide 29 arranged so that when the filter unit is in place the horizontal centre line of the filter element as formed by the ring 1 and filter plates 4 and 5 will be at the correct required distance from the centre line of the target 30 of the X-ray source. In practise the preferred distance between the filter element and the X-ray target has been found to be approximately 6¾ inches.

It will be appreciated, of course, that the mounting slide plate 20 may be varied as required, to enable the filter unit to be mounted on the various types of X-ray machines, or other suitable mounting means may be provided.

Figure 4:
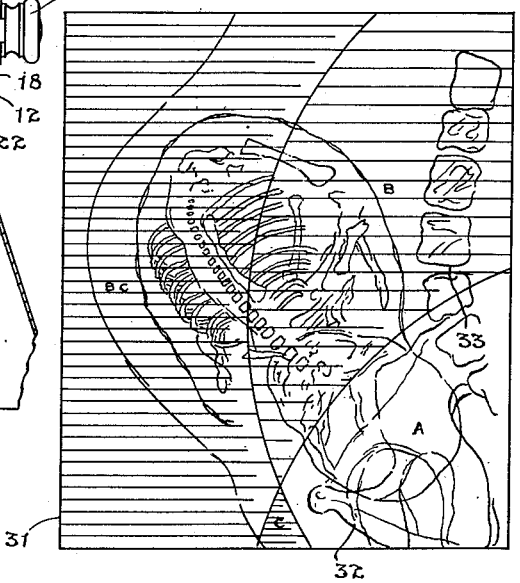
Figure 4 illustrates the X-ray negative of the placenta obtained with the arrangement of Figure 3, the negative being shaded to indicate the portions covered by the segments of the filter element.

With the arrangement of the filter plates or segments 4 and 5 as described, the filter is particularly adapted for use in obstetrics, for taking X-rays of the human placenta to indicate the stage of development and position of the fetus enveloped thereby, with the rays passing through the open area A of the filter element being directed towards the dense bone structure of the pelvic bone and back bone of the patient placed on her side beneath the cone 24 and with the rays passing through the progressively thickening filter portion B, C and BC being directed towards the progressively less dense organs and body tissue. The rays, therefore, on passing through the filter and the patient are of substantially even density over the whole area X-rayed so that a sensitized film 31 placed beneath the patient will be subjected to an even exposure and when developed will result in an even density negative as illustrated in Figure 4, wherein the bone structures and tissues are depicted with equal clarity. If no filter were used, an exposure of sufficient length to penetrate the bone structure and activate the portion of the film located beneath the bone would, of course, completely burn the remainder of the film.

As depicted in the negative of Figure 4, the area of the negative marked off as A, which includes a portion of the pelvic bone 32 and the back bone 33 and the heavier bone structure of the fetus, corresponds to the open portion A of the filter and was activated by the unimpeded rays from the X-ray source passing directly through the patient. The area of the negative marked B includes the less dense bone structure and organs of the fetus and enveloping placenta and includes that portion of the film which subtended the area B of the filter being activated by the rays remaining after penetration of both the filter plate 4 and the patient.

Similarly, areas BC and C of the negative correspond to the areas BC and C of the filter element. The shading on the negative is placed to indicate the relative thickness of the filter element, the most heavily shaded areas representing the areas covered by the thickest portion of the filter element.

In making the examination it is preferable to take X-rays from both sides of the patient and to enable the two exposures to be quickly taken the filter mounting ring 1 can be readily rotated on the pivots 11 and 12 from the position of Figures 5 and 7 to the position of Figures 6 and 8 with the second exposure made with the patient lying on the opposite side.

The reversing of the filter element is very simply accomplished by grasping and turning the knob 15 through 180°, the correct position of the filter element being automatically selected by the balls 16 springing into the recesses 17 in the casing boss 14 or by the action of the spring bronze indexing disc 18.

It is extremely important to note that with the ring rotatably mounted by means of the pivot pins 11 and 12 entering the pivot lugs 2 to form a pivot axis which coincides with the horizontal centre line of the filter element as formed by the plates 4 and 5, the distance from the X-ray source to the filter centre line will not change when the ring 1 is rotated through 180°. Thus the filter element can be quickly reversed without moving the complete unit and will remain at the correct distance from the X-ray source.

It will be understood that the casting of the mount 10 enables a ready and accurate assembly of the complete unit to be effected and the provision of the spun copper radiographic cone 24 serves to limit the divergence of the rays passing through the filter to concentrate the rays on the desired area under investigation.

The casting and cone could, of course, be formed as an integral unit if desired to form a unitary radiographic cone for supporting the filter element.

While I have described a filter particularly adapted for studying one portion of the body, it will be appreciated that filters embodying my invention can be constructed for examination of any part of the body or for examining other objects of variable density, it being merely necessary to construct and arrange the filter plates in such a manner that the thickness of the filter element varies inversely to the variation of density of the object to be examined, the least dense portion of the object being located beneath the thickest portion of the filter.

From the foregoing it will be readily understood that my filter will be relatively inexpensive to produce and will be extremely light and convenient to use, enabling a single comprehensive X-ray picture to be obtained of an object of variable density.

Further, by having the filter element rotatably mounted, a second exposure from the opposite side of the object can be very readily obtained and the two X-rays compared to provide an accurate basis for making a proper diagnosis.

Thus, the use of my filter in obtaining a single, comprehensive negative will result in the saving of time and material and will prove of great benefit in eliminating inaccuracies in radiography resulting from improper correlation of the several negatives previously required to cover the same area of examination.

It will be understood, of course, that a filter element embodying my invention may be made as a composite filter embodying materials with different X-ray absorption coefficients, and the filter element could be of uniform physical thickness but presenting a varying barrier to the passage of X-rays therethrough.

What I claim as my invention is:

1. An X-ray filter unit comprising a filter element of varying thickness, the variations in thickness of said filter element corresponding to the variations in density of the object to be X-rayed, support means for said filter element, said filter element being rotatably mounted in said support means for reversal through 180° about an axis lying in the central plane of said element to maintain a constant spacing between said filter element and an X-ray source when reversed, and means engaging said filter element to releasably hold same against rotation in either of two positions 180° apart said filter unit being adapted to be mounted whereby the X-rays directed towards the least dense portion of the object being X-rayed pass through the thickest portion of the filter element, and the X-rays directed towards the most dense portion of the object pass through the thinnest portion of the filter element.

2. An X-ray filter unit comprising a radiographic cone and a filter element comprising a plurality of tapered filter plates arranged in overlapping relation, said filter element being rotatably mounted for reversal through 180° about an axis lying in the central plane of said element in said cone to maintain a constant spacing between said filter element and an X-ray source when reversed.

3. An X-ray filter unit comprising a mounting casing, a ring provided with pivot lugs disposed out of the plane of said ring and rotatably supported by said pivot lugs in said mounting casing, tapered filter plates secured in overlapping relation to said ring with the centre plane of said filter plates coinciding with the rotation axis of said pivot lugs to permit said ring to be reversed while maintaining the centre plane of said filter plates a fixed distance from an X-ray source.

4. A device as claimed in claim 3 in which means are provided to rotate said ring, and indexing means are provided and co-operating with said rotation means and said casing to position said ring in the desired position of rotation relative said casing.

5. An X-ray filter unit comprising a cylindrical mounting casing, a ring rotatably mounted in said casing, means for rotating said ring, a plurality of tapered filter plates arranged in said ring in overlapping relation and leaving a portion of said ring open to provide a plurality of areas of distinctively different filtering characteristics, a conical extension extending from said casing to limit the divergence of rays passing through said filter plates, and means for mounting said casing in position relative and X-ray source.

6. An X-ray filter unit comprising a cylindrical casing, a ring, pivot lugs secured to said ring in diametrically opposing relation, said ring being pivoted on said pivot lugs within said casing, a plurality of filter plates arranged on said ring in overlapping relation with the pivot axis of said pivot lugs lying in the centre plane of said plates to permit the centre plane of said plates to remain in the same plane when said ring is rotated through 180°, a conical extension extending from said casing, and means for mounting said casing in position relative an X-ray source.

7. A placenta filter unit comprising a radiographic cone adapted to be mounted between an X-ray source and a patient, a ring reversibly mounted in said cone, a tapered crescent shaped filter plate secured to said ring, a second tapered crescent shaped filter plate of greater thickness than said first mentioned plate secured to said ring and having a portion thereof overlapping said first mentioned plate, said ring and plates forming a filter element having an open area to permit the direct passage of X-rays directed from said source towards the heavy bone structure of the patient and having areas of thickness corresponding to the tapering thickness of said first mentioned plate and said second mentioned plate and the combination of said plates together, said areas being so arranged that the X-rays directed towards the increasingly less dense bone structure and body tissue of the patient are subjected to an increased filtering action whereby a single negative of substantially even density of the area X-rayed is obtained from either side of the patient as permitted by the reversal of said ring.

8. A placenta filter element comprising a ring, a plurality of crescent-shaped filter segments of different graduated thickness mounted on said ring in overlapping relation and providing within said ring a sector-like open area shaped to permit X-rays directed at a patient through said filter element to pass unimpeded to cover the pelvic and back bones and dense fetus bone structure of the patient, a sector-like filter area of relatively small filtering capacity shaped to filter rays directed towards less dense bone structure and organs of the fetus, and a further area of relatively large filtering capacity filtering rays directed towards less dense fetus structure.

ARNOLD C. BURKE.

REFERENCES CITED

The following references are of record in the file of this patent:

UNITED STATES PATENTS

| Number | Name | Date |
|---|---|---|
| 1,535,359 | Tousey | Apr. 28, 1925 |
| 2,094,103 | Horsley et al. | Sept. 28, 1937 |
| 2,216,326 | Smith | Oct. 1, 1940 |
| 2,405,444 | Moreau et al. | Aug. 6, 1946 |

FOREIGN PATENTS

| Number | Country | Date |
|---|---|---|
| 15,678 | Great Britain | July 4, 1912 |
| 450,994 | Germany | Oct. 18, 1927 |